US012618954B2

(12) United States Patent (10) Patent No.: US 12,618,954 B2
Ravi Kumar et al. (45) Date of Patent: May 5, 2026

(54) CAMERA SOILING DETECTION USING ATTENTION-GUIDED CAMERA DEPTH AND LIDAR RANGE CONSISTENCY GATING

(71) Applicant: QUALCOMM Incorporated, San Diego, CA (US)

(72) Inventors: Varun Ravi Kumar, San Diego, CA (US); Senthil Kumar Yogamani, Headford (IE); Shivansh Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/464,769

(22) Filed: Sep. 11, 2023

(65) Prior Publication Data

US 2025/0085407 A1 Mar. 13, 2025

(51) Int. Cl.
 *G06V 20/56* (2022.01)
 *G01S 7/497* (2006.01)
 (Continued)

(52) U.S. Cl.
 CPC .............. *G01S 7/497* (2013.01); *G01S 17/86* (2020.01); *G01S 17/931* (2020.01); *G01S 2007/4975* (2013.01)

(58) Field of Classification Search
 CPC . G06T 2207/30168; G06T 2207/10028; G06T 2207/20076; G06T 2207/20081;
 (Continued)

(56) References Cited

U.S. PATENT DOCUMENTS 9,495,764 B1 * 11/2016 Boardman ............. G06V 20/64
2009/0060354 A1 * 3/2009 Xiao .................. H04N 1/40062
 382/232
(Continued)

OTHER PUBLICATIONS

Das A., et al., "TiledSoilingNet: Tile-level Soiling Detection on Automotive Surround-view Cameras Using Coverage Metric", arXiv:2007.00801v1 [cs.CV] Jul. 1, 2020, 6 Pages.
(Continued)

*Primary Examiner* — Dionne Pendleton
(74) *Attorney, Agent, or Firm* — Shumaker & Sieffert, P. A.

(57) ABSTRACT

A method includes receiving a plurality of images, wherein a first image of the one or more images comprises a range image and a second image comprises a camera image and filtering the first image to generate a filtered first image. The method also includes generating a plurality of depth estimates based on the second image and generating an attention map by combining the filtered first image and the plurality of depth estimates. Additionally, the method includes generating a consistency score indicative of a consistency of depth estimates between the first image and the second image based on the attention map, modulating one or more features extracted from the second image based on the consistency score using a gating mechanism to generate modulated one or more features, and generating a classification of one or more soiled regions in the second image based on the modulated one or more features.

28 Claims, 5 Drawing Sheets

(51) Int. Cl.

| | |
|---|---|
| *G01S 17/86* | (2020.01) |
| *G01S 17/931* | (2020.01) |
| *G06V 10/82* | (2022.01) |

(58) Field of Classification Search

CPC ............. G06T 2207/30252; G06T 5/77; G06T 7/0002; G06T 17/00; G06T 2207/10016; G06T 2207/30181; G06T 2207/30261; G06T 3/4046; G06T 7/50; G06T 7/55; G06T 7/62; G06T 2207/20084; G06T 7/70; G06T 5/50; G06T 7/74; G06T 7/80; G06T 17/05; G06T 7/11; G06T 7/521; G06T 7/579; G06T 7/593; G06T 9/00; G06T 2207/10024; G06T 2207/20016; G06T 2207/30256; G06T 17/20; G06T 2200/04; G06T 2207/10021; G06T 2207/20048; G06T 2207/30248; G06T 2210/56; G06T 2215/12; G06T 7/10; G06T 7/20; G06T 7/246; G06T 7/248; G06T 7/68; G06T 7/73; G06T 11/00; G06T 19/006; G06T 2207/10004; G06T 2207/10012; G06T 2207/10044; G06T 2207/20224; G06T 2207/30244; G06T 3/4038; G06T 3/4061; G06T 3/60; G06T 5/70; G06T 7/254; G06T 7/277; G06T 7/33; G06T 7/536; G01S 17/931; G01S 7/497; G01S 17/86; G01S 17/89; G01S 2007/4975; G01S 2007/4977; G01S 13/867; G01S 13/931; G01S 7/4802; G01S 17/42; G01S 7/4808; G01S 13/865; G01S 17/894; G01S 17/08; G01S 2013/9316; G01S 13/862; G01S 13/89; G01S 7/28; G01S 7/417; G01S 7/481; G01S 13/584; G01S 13/60; G01S 17/10; G01S 17/58; G01S 19/42; G01S 19/46; G01S 19/47; G01S 2013/9318; G01S 2013/93185; G01S 2013/932; G01S 2013/9323; G01S 7/003; G01S 7/354; G01S 7/356; G01S 13/003; G01S 13/34; G01S 13/42; G01S 13/87; G01S 17/18; G01S 17/87; G01S 17/93; G01S 2013/9314; G01S 2013/9315; G01S 2013/9322; G01S 2013/93271; G01S 2013/93272; G01S 7/352; G01S 7/40; G01S 7/4026; G01S 7/4811; G01S 7/4814; G01S 7/4817; G01S 7/4876; G01S 7/4972; G06V 20/56; G06V 10/34; G06V 10/62; G06V 10/764; G06V 10/771; G06V 10/809; G06V 10/811; G06V 10/82; G06V 10/993; G06V 20/64; G06V 10/16; G06V 10/7715; G06V 10/803; G06V 10/806; G06V 20/58; G06V 20/70; G06V 30/142; G06V 40/14; G06V 10/40; G06V 10/462; G06V 10/757; G06V 10/80; G06V 20/588; G06V 10/44; G06V 10/454; G06V 10/751; G06V 10/758; G06V 20/584; G06V 20/647; G06V 2201/07; G06V 10/147; G06V 10/25; G06V 10/255; G06V 10/26; G06V 10/30; G06V 10/774; G06V 2201/12; B60S 1/56; B60W 2050/0215; B60W 2420/403; B60W 50/0205; B60W 50/029; B60W 2420/408; B60W 60/001; B60W 30/0956; B60W 2554/20; B60W 2554/4029; B60W 2552/00; B60W 2552/53; B60W 30/09; B60W 40/02; B60W 40/06; B60W 10/18; B60W 10/30; B60W 2050/143; B60W 2300/145; B60W 2420/54; B60W 2510/18; B60W 2510/20; B60W 2554/80; B60W 30/06; B60W 30/08; B60W 30/18154; B60W 30/18163; B60W 50/14; B60W 60/00; B60W 60/0011; B60W 60/0016; B60W 60/0027; G05D 1/0246; G05D 1/249; G05D 1/0231; G05D 1/024; G05D 1/0088; G05D 1/0257; G05D 1/81; G05D 1/0094; G05D 1/0251; G05D 1/027; G05D 1/0274; G05D 1/0278; G05D 1/2435; H04N 1/40062; H04N 1/41; H04N 1/64; H04N 17/002; H04N 23/81; H04N 23/90; H04N 19/597; H04N 13/122; H04N 13/128; H04N 13/239; H04N 13/243; H04N 13/246; H04N 13/25; H04N 13/271; H04N 2013/0081; G06N 3/04; G06N 3/045; G06N 3/08; G06N 3/0464; G06N 3/09; G06N 20/00; G06N 7/01; G06N 3/0455; G06N 3/0895; G06F 18/213; G06F 18/253; G06F 18/25; G06F 18/251; G06F 18/2113; G06F 18/2155; G06F 18/217; G06F 18/22; G06F 18/24; G06F 18/2415; G06F 18/2413; B60R 16/0231; B62D 15/025; B62D 15/0285; G08G 1/166; G08G 1/20; G08G 1/04; G08G 1/165; G01C 21/3811; G01C 21/3815; G01C 11/06; G01C 11/12; G01C 11/30; G01C 21/005; G01C 21/1652; G01C 21/1656; G01C 21/30; G01C 21/3602; G01C 21/3635; G01C 21/3694; G01C 21/3848; G01C 21/3867; G01C 21/165; G01C 21/1654; G01B 11/22

See application file for complete search history.

(56) References Cited

U.S. PATENT DOCUMENTS

| | | | |
|---|---|---|---|
| 2021/0201464 A1 | 7/2021 | Tariq et al. | |
| 2023/0177839 A1* | 6/2023 | Bajpayee | G06F 18/213 |
| 2025/0037444 A1* | 1/2025 | Kum | G06T 7/50 |

OTHER PUBLICATIONS

Uricar M., et al., "Let's Get Dirty: GAN Based Data Augmentation for Camera Lens Soiling Detection in Autonomous Driving", arXiv:1912.02249v3 [cs.CV] Nov. 14, 2020, 16 Pages.

Uricar M., et al., "SoilingNet: Soiling Detection on Automotive Surround-View Cameras", arXiv:1905.01492v2 [cs.CV] Jul. 17, 2019, 6 Pages.

Hu J., et al., "Deep Depth Completion from Extremely Sparse Data: A Survey", Journal of Latex Class Files, vol. 14, No. 8, May 2022, arXiv:2205.05335v3[cs.CV], arxiv.org, Cornell University Library, 201 Olin Library Cornell University Ithaca, NY 14853, Aug. 29, 2022, pp. 1-24.

International Search Report and Written Opinion—PCT/US2024/043070—ISA/EPO—Dec. 11, 2024 11 Pages.

Li M., et al., "Attention-based Radar and Camera Fusion for Object Detection in Severe Conditions", 2022 International Conference on Frontiers of Communications, Information System and Data Science (CISDIS), IEEE, Nov. 25, 2022, pp. 117-121.

\* cited by examiner 402A
402B
402C
402D
402E
402F
402G
402H

CAMERA SOILING DETECTION USING ATTENTION-GUIDED CAMERA DEPTH AND LIDAR RANGE CONSISTENCY GATING

TECHNICAL FIELD

This disclosure relates to cognitive neural networks.

BACKGROUND

Autonomous vehicles and semi-autonomous vehicles may use artificial intelligence and machine learning—specifically deep neural networks (DNNs)—for performing any number of operations for operating, piloting, and navigating the vehicle. For example, DNNs may be used for object detection, lane and road boundary detection, safety analysis, drivable free-space analysis, control generation during vehicle maneuvers, and/or other operations. Before any autonomous or semi-autonomous vehicle can safely navigate on the road, the DNNs and other software that enable the vehicle to drive itself are generally tested to verify and validate that they perform safely. More specifically, DNN-powered autonomous and semi-autonomous vehicles should be able to respond properly to an incredibly diverse set of situations, including interactions with emergency vehicles, pedestrians, animals, and a virtually infinite number of other obstacles For autonomous vehicles to achieve autonomous driving levels 3-5 (e.g., conditional automation (Level 3), high automation (Level 4), and full automation (Level 5)) the autonomous vehicles should be capable of operating safely in all environments, and without the requirement for human intervention when potentially unsafe situations present themselves. Advanced Driver Assistance Systems (ADAS) use sensors and software to help vehicles avoid hazardous situations to ensure safety and reliability. Cameras are an essential part of the sensor suite to achieve Level 3 autonomous driving because they provide a high-resolution view of the surrounding environment. Cameras allow autonomous vehicles to see other vehicles, pedestrians, and obstacles, and to make decisions about how to navigate safely. Surround-view cameras are a type of camera that is mounted on the outside of the autonomous vehicle. Surround-view cameras provide a 360-degree view of the vehicle's surroundings, which is essential for autonomous driving. However, surround-view cameras are also directly exposed to the external environment, which means that these cameras may get soiled by rain, fog, or snow.

SUMMARY

In general, this disclosure describes techniques for the camera soiling detection. Surround-view cameras are directly exposed to the external environment, which means that they are vulnerable to getting soiled by rain, fog, snow, dust, and mud. Soiling may significantly impact the performance of the cameras, making it difficult for the autonomous vehicles to see other vehicles, pedestrians, and obstacles. For example, rain may cause water droplets to form on the camera lens, which may blur the image. Fog may also cause the image to be blurred, and snow may block the view entirely. Dust and mud may also interfere with the camera's ability to see clearly.

This disclosure describes example techniques for more accurately detecting soiling on the cameras. That is, in one or more examples, the example techniques include facilitation of the soiling detection using range images, such as range image produced from Light Detection and Ranging (LIDAR) sensors. LIDAR sensors uses laser light to measure the distance to objects in the environment. This allows a LIDAR sensor to create a three-dimensional (3D) map of the surrounding area, which may be used for a variety of purposes, including autonomous driving. A range image may be obtained from a LIDAR sensor. The range image is a two-dimensional (2D) image that represents the distance to objects in the scene. The range image may be obtained by using a LIDAR sensor to measure the time it takes for laser pulses to travel to objects and back.

Depth estimates may be obtained from the camera's depth decoder. An encoder is a part of the camera that may be used to extract features from the image. These features may then be used to train a model that may estimate the depth of objects in the scene. The extracted features may then be used in the feature gating module to determine which features should be used to estimate the depth of the scene. The depth estimates from the camera and LIDAR sensor may then be combined to produce a single depth estimate for the scene. Next, distance-based segmentation technique may generate an attention map that highlights regions where the camera is likely to be soiled. Advantageously, the disclosed real-time soiling detection techniques improve the safety of autonomous driving systems. As yet another non-limiting advantage, the disclosed machine learning techniques are computationally efficient.

In one example, a method includes receiving a plurality of images, wherein a first image of the one or more images comprises a range image and a second image comprises a camera image, and filtering, by one or more processors, the first image to generate a filtered first image. The filtering includes a filter configured to fill in one or more sparse regions in the first image. The method also includes generating, by the one or more processors, a plurality of depth estimates based on the second image and generating, by the one or more processors, an attention map by combining the filtered first image and the plurality of depth estimates. Additionally, the method includes generating, by the one or more processors, a consistency score indicative of a consistency of depth estimates between the first image and the second image based on the attention map and modulating, by the one or more processors, one or more features extracted from the second image based on the consistency score using a gating mechanism to generate modulated one or more features. Finally, the method includes generating, by the one or more processors, a classification of one or more soiled regions in the second image based on the modulated one or more features.

In another example, an apparatus for camera soiling detection includes a memory for storing a plurality of images; and processing circuitry in communication with the memory. The processing circuitry is configured to receive the plurality of images, wherein a first image of the one or more images comprises a range image and a second image comprises a camera image and filter the first image to generate a filtered first image. The filtering includes a filter configured to fill in one or more sparse regions in the first image. The processing circuitry is also configured to generate a plurality of depth estimates based on the second image and generate an attention map by combining the filtered first image and the plurality of depth estimates. Additionally, the processing circuitry is configured to generate a consistency score indicative of a consistency of depth estimates between the first image and the second image based on the attention map and modulate one or more features extracted from the second image based on the consistency score using a gating mechanism to generate modulated one or more features. Finally, the processing circuitry is configured to generate a classification of one or more soiled regions in the second image based on the modulated one or more features.

In yet another example, a computer-readable medium includes instructions that, when applied by processing circuitry, cause the processing circuitry to: receive a plurality of images, wherein a first image of the one or more images comprises a range image and a second image comprises a camera image and filter the first image to generate a filtered first image. The filtering includes a filter configured to fill in one or more sparse regions in the first image. Additionally, the instructions cause the processing circuitry to generate a plurality of depth estimates based on the second image, generate an attention map by combining the filtered first image and the plurality of depth estimates, generate a consistency score indicative of a consistency of depth estimates between the first image and the second image based on the attention map, modulate one or more features extracted from the second image based on the consistency score using a gating mechanism to generate modulated one or more features, and generate a classification of one or more soiled regions in the second image based on the modulated one or more features.

The details of one or more examples are set forth in the accompanying drawings and the description below. Other features, objects, and advantages will be apparent from the description, drawings, and claims.

DETAILED DESCRIPTION

Figure 1:
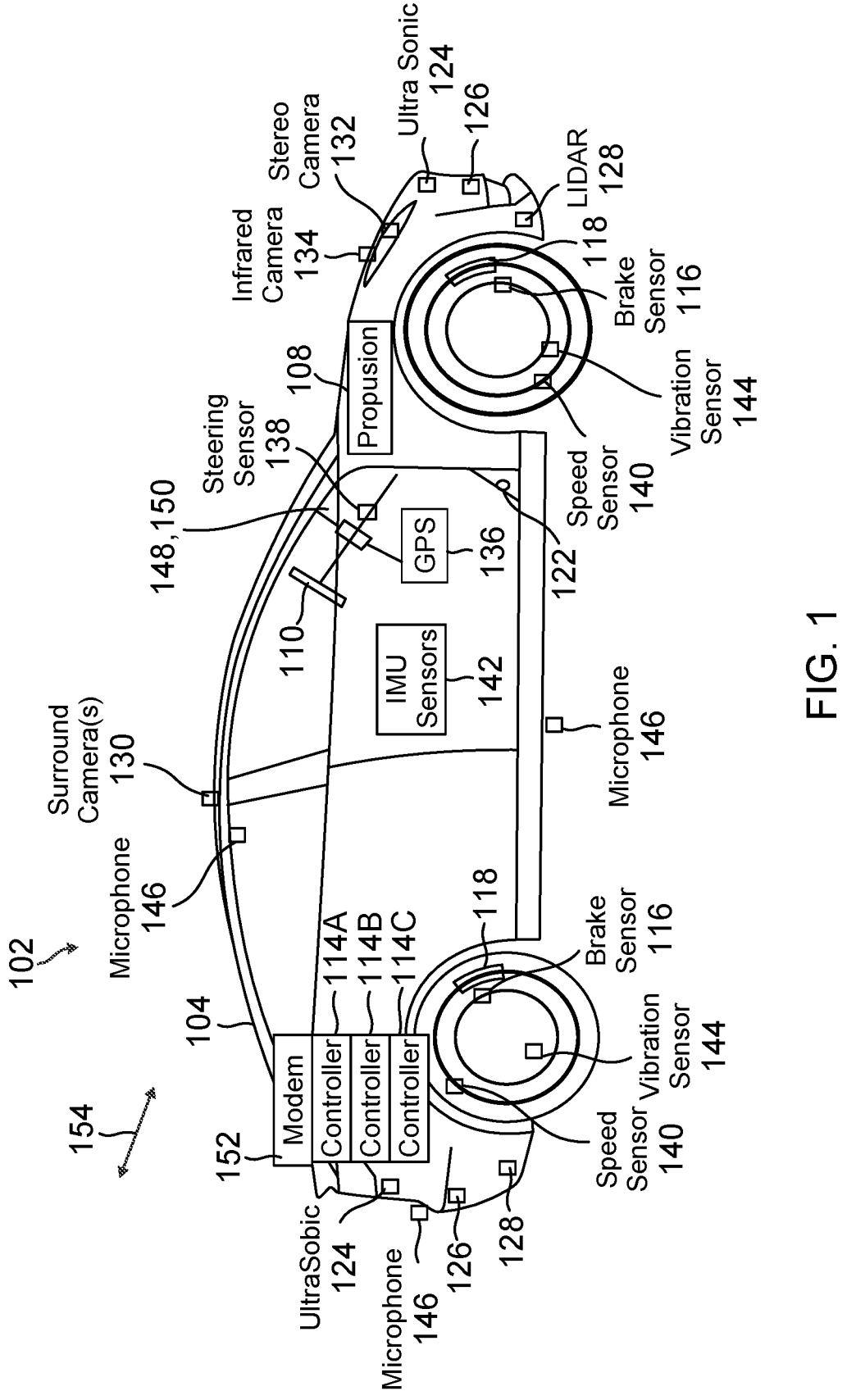
FIG. 1 is a diagram of an example autonomous vehicle, in accordance with the techniques of this disclosure.

For autonomous vehicles to achieve autonomous driving levels 3-5 (e.g., conditional automation (Level 3), high automation (Level 4), and full automation (Level 5)), the autonomous vehicles should be capable of operating safely in all environments, and without the requirement for human intervention when potentially unsafe situations present themselves. Advanced Driver Assistance Systems (ADAS) use sensors and software to help vehicles avoid hazardous situations to ensure safety and reliability. Cameras are an essential part of the sensor suite to achieve Level 3 autonomous driving because they provide a high-resolution view of the surrounding environment. Cameras allow autonomous vehicles to see other vehicles, pedestrians, and obstacles, and to make decisions about how to navigate safely. Surround-view cameras are a type of camera that is mounted on the outside of the autonomous vehicle. Surround-view cameras provide a 360-degree view of the vehicle's surroundings, which is essential for autonomous driving. However, surround-view cameras are also directly exposed to the external environment, which means that these cameras may get soiled by rain, fog, or snow.

Dust and mud may have a significant impact on vision tasks performance because they may block the light from reaching the camera sensor. Such blockage may make it difficult for the camera to see objects in the scene, which may lead to errors in vision tasks such as object detection, tracking, and segmentation. Dust and mud may also scatter the light making it difficult for the camera to focus on objects. Scattered light may also lead to errors in vision tasks. In addition, dust and mud may change the color of objects in the scene, which may also make it difficult for the camera to identify objects. Cameras have a much higher degradation in performance due to soiling compared to other sensors because they rely on light to see. Other sensors, such as radar and LIDAR, do not rely on light to see, so they are not as affected by soiling. Radar uses radio waves to measure the distance to objects, and LIDAR sensor uses laser light to measure the distance to objects. Both of these sensors may still function even if the camera lens is soiled. The degradation in performance due to soiling may be particularly severe for cameras used in autonomous driving because autonomous vehicles need to be able to see clearly in order to navigate safely. For higher autonomous driving levels, such as Level 4 and Level 5, the autonomous vehicle is expected to be able to operate without any human input. In other words, autonomous vehicle's sensors should be able to accurately detect and avoid obstacles, even in challenging conditions such as rain, fog, or snow. If the cameras are soiled, they may not be able to see obstacles clearly, which may lead to an accident.

This disclosure describes example techniques for more accurately detecting soiling on the cameras. In one or more examples, the example techniques include facilitation of the soiling detection using LIDAR sensor's range images.

A range image is a 2D image where each pixel represents the distance between the sensor and the nearest object in the scene. Range images may be created using LIDAR sensors, which may emit laser pulses and may measure the time it takes for the pulses to return. The distance to the nearest object may then be calculated based on the time of flight of the laser pulses. In autonomous driving, range images may be used to create a 3D map of the surrounding environment, which may be used to help the autonomous vehicle navigate safely. Advantageously, range images may be generated in real time. Range images provide a denser representation of the 3D scene than sparse point cloud representation. A sparse point cloud representation is a collection of points in 3D space, where each point represents the location of an object in the scene. The points are typically not connected, which means that there is no information about the relationships between the points. A range image, on the other hand, is a complete 2D representation of the 3D scene. In other words, the range image contains information about the distance between the sensor and every object in the scene. Such information may be used to reconstruct the 3D scene, which may be useful for autonomous driving. A morphological filter is a type of image processing filter that may be used to fill in sparse regions in a range image. The dilation filter is a morphological filter that expands regions of high intensity in an image. The dilation filter may be used to fill in sparse regions in a range image by expanding the regions of high intensity, which are typically the regions that contain objects.

In an aspect, once the range image is obtained from the LIDAR sensor and the camera depth estimates are obtained from the camera, a machine learning system may use a distance-based segmentation technique to generate an attention map that highlights regions where the camera is likely to be soiled. The attention map may capture one or more regions where the depth estimates differ significantly, which are more likely to be affected by soiling. In an aspect, the machine learning system may generate a Structural Similarity Index Matrix (SSIM) score to create an attention-guided depth consistency measure. In an aspect, the machine learning system may use a feature gating mechanism to modulate the extracted camera features based on the attention-guided depth consistency measure, before passing the results on to a soiling decoder. In an aspect, the soiling decoder may output multi-class probabilities with a softmax function.

FIG. 1 shows an example autonomous vehicle 102. Autonomous vehicle 102 in the example shown may comprise a passenger vehicle such as a car or truck that can accommodate a human driver and/or human passengers. In an aspect, autonomous vehicle 102 may comprise an ADAS system. Autonomous vehicle 102 may include a vehicle body 104 suspended on a chassis, in this example comprised of four wheels and associated axles. A propulsion system 108 such as an internal combustion engine, hybrid electric power plant, or even all-electric engine may be connected to drive some or all of the wheels via a drive train, which may include a transmission (not shown). A steering wheel 110 may be used to steer some or all of the wheels to direct autonomous vehicle 102 along a desired path when the propulsion system 108 is operating and engaged to propel the autonomous vehicle 102. Steering wheel 110 or the like may be optional for Level 5 implementations. One or more controllers 114A-114C (a controller 114) may provide autonomous capabilities in response to signals continuously provided in real-time from an array of sensors, as described more fully below.

Each controller 114 may be essentially one or more onboard computers that may be configured to perform deep learning and artificial intelligence functionality and output autonomous operation commands to self-drive autonomous vehicle 102 and/or assist the human vehicle driver in driving. Each vehicle may have any number of distinct controllers for functional safety and additional features. For example, controller 114A may serve as the primary computer for autonomous driving functions, controller 114B may serve as a secondary computer for functional safety functions, controller 114C may provide artificial intelligence functionality for in-camera sensors, and controller 114 (D (not shown) may provide infotainment functionality and provide additional redundancy for emergency situations.

Controller 114 may send command signals to operate vehicle brakes 116 via one or more braking actuators 118, operate steering mechanism via a steering actuator, and operate propulsion system 108 which also receives an accelerator/throttle actuation signal 122. Actuation may be performed by methods known to persons of ordinary skill in the art, with signals typically sent via the Controller Area Network data interface ("CAN bus")—a network inside modern cars used to control brakes, acceleration, steering, windshield wipers, and the like. The CAN bus may be configured to have dozens of nodes, each with its own unique identifier (CAN ID). The bus may be read to find steering wheel angle, ground speed, engine RPM, button positions, and other vehicle status indicators. The functional safety level for a CAN bus interface is typically Automotive Safety Integrity Level (ASIL) B. Other protocols may be used for communicating within a vehicle, including FlexRay and Ethernet.

In an aspect, an actuation controller may be obtained with dedicated hardware and software, allowing control of throttle, brake, steering, and shifting. The hardware may provide a bridge between the vehicle's CAN bus and the controller 114, forwarding vehicle data to controller 114 including the turn signal, wheel speed, acceleration, pitch, roll, yaw, Global Positioning System ("GPS") data, tire pressure, fuel level, sonar, brake torque, and others. Similar actuation controllers may be configured for any other make and type of vehicle, including special-purpose patrol and security cars, robo-taxis, long-haul trucks including tractor-trailer configurations, tiller trucks, agricultural vehicles, industrial vehicles, and buses.

Controller 114 may provide autonomous driving outputs in response to an array of sensor inputs including, for example: one or more ultrasonic sensors 124, one or more RADAR sensors 126, one or more LIDAR sensors 128, one or more surround cameras 130 (typically such cameras are located at various places on vehicle body 104 to image areas all around the vehicle body), one or more stereo cameras 132 (in an aspect, at least one such stereo camera may face forward to provide object recognition in the vehicle path), one or more infrared cameras 134, GPS unit 136 that provides location coordinates, a steering sensor 138 that detects the steering angle, speed sensors 140 (one for each of the wheels), an inertial sensor or inertial measurement unit ("IMU") 142 that monitors movement of vehicle body 104 (this sensor can be for example an accelerometer(s) and/or a gyro-sensor(s) and/or a magnetic compass(es)), tire vibration sensors 144, and microphones 146 placed around and inside the vehicle. Other sensors may be used, as is known to persons of ordinary skill in the art.

Controller 114 may also receive inputs from an instrument cluster 148 and may provide human-perceptible outputs to a human operator via human-machine interface ("HMI") display(s) 150, an audible annunciator, a loudspeaker and/or other means. In addition to traditional information such as velocity, time, and other well-known information, HMI display 150 may provide the vehicle occupants with information regarding maps and vehicle's location, the location of other vehicles (including an occupancy grid) and even the Controller's identification of objects and status. For example, HMI display 150 may alert the passenger when the controller has identified the presence of a soiled region, stop sign, caution sign, or changing traffic light and is taking appropriate action, giving the vehicle occupants peace of mind that the controller 114 is functioning as intended.

In an aspect, instrument cluster 148 may include a separate controller/processor configured to perform deep learning and artificial intelligence functionality.

Autonomous vehicle 102 may collect data that is preferably used to help train and refine the neural networks used for autonomous driving. The autonomous vehicle 102 may include modem 152, preferably a system-on-a-chip that provides modulation and demodulation functionality and allows the controller 114 to communicate over the wireless network 154. Modem 152 may include an RF front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem 152 preferably includes wireless functionality substantially compliant with one or more wireless protocols such as, without limitation: LTE, WCDMA, UMTS, GSM, CDMA2000, or other known and widely used wireless protocols.

It should be noted that, compared to sonar and RADAR sensors 126, cameras 130-134 may generate a richer set of features at a fraction of the cost. Thus, autonomous vehicle 102 may include a plurality of cameras 130-134, capturing images around the entire periphery of the autonomous vehicle 102. Camera type and lens selection depends on the nature and type of function. The autonomous vehicle 102 may have a mix of camera types and lenses to provide complete coverage around the autonomous vehicle 102; in general, narrow lenses do not have a wide field of view but can see farther. All camera locations on the autonomous vehicle 102 may support interfaces such as Gigabit Multimedia Serial link (GMSL) and Gigabit Ethernet.

In an aspect, a controller 114 may receive a plurality of images acquired by a plurality of cameras 130-134. At least one of the images plurality of images may include a LIDAR sensor range image 302 obtained from LIDAR sensor(s) 128. At least one other image may include a multi-camera input image 304 obtained from one or more cameras 130-134. Next, controller 114 may filter a first image (LIDAR sensor range image 302 shown in FIG. 3) to fill in one or more sparse regions in the first image. Controller 114 may then generate a plurality of depth estimates based on a second image (camera input image 304 shown in FIG. 3). In addition, controller 114 may generate an attention map by combining the filtered first image and the plurality of depth estimates. Furthermore, controller 114 may generate a consistency score indicative of a consistency of depth estimates between the first image and the second image based on the attention map. Controller 114 may modulate one or more features extracted from the second image based on the consistency score using a gating mechanism. Next, controller 114 may generate a classification of one or more soiled regions in the second image based on the modulated one or more features.

Figure 2:
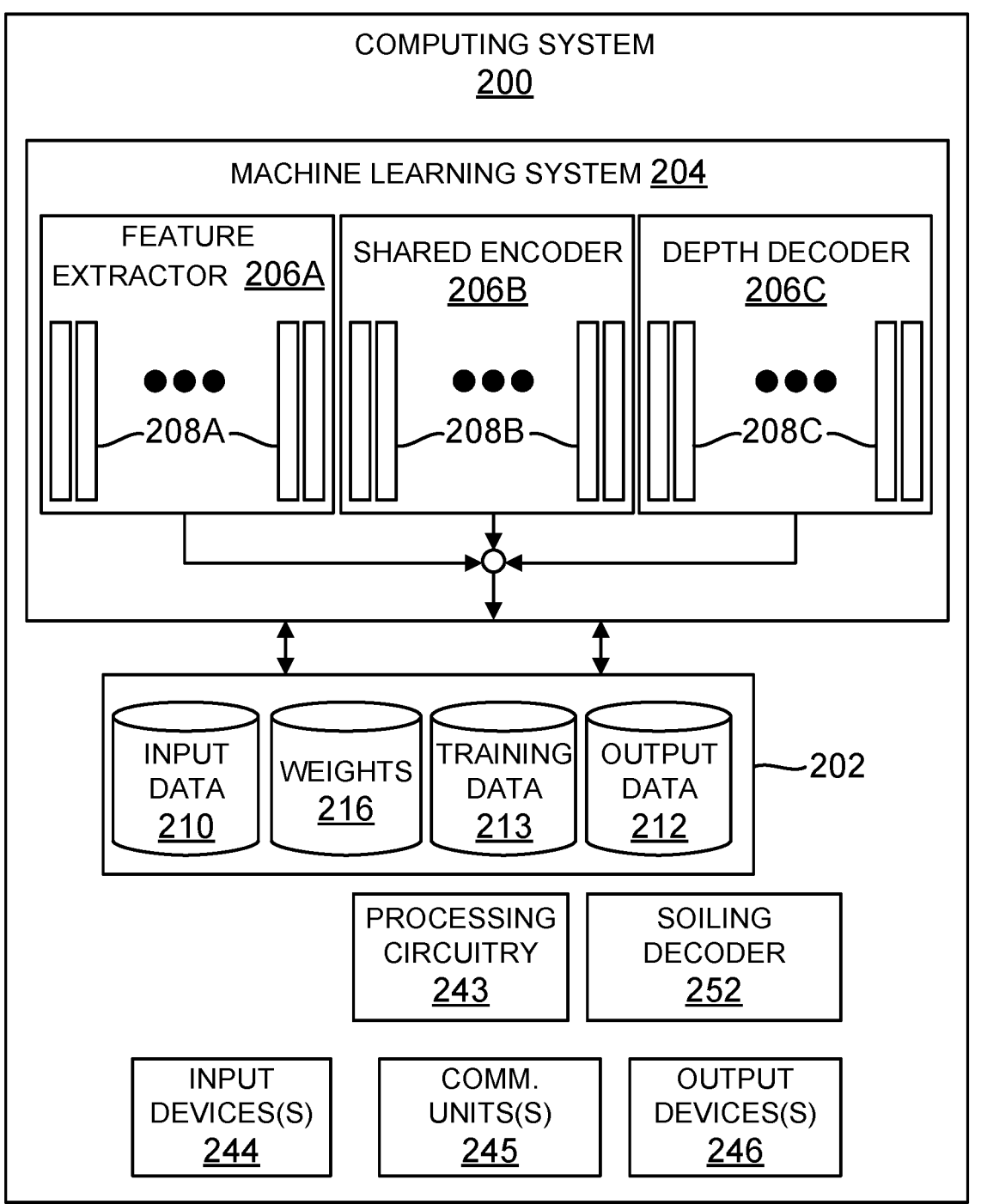
FIG. 2 is a block diagram illustrating an example system that may perform the techniques of this disclosure.

FIG. 2 is a block diagram illustrating an example computing system 200. As shown, computing system 200 comprises processing circuitry 243 and memory 202 for executing a machine learning system 204, which may represent an example instance of any controller 114 described in this disclosure, such as controller 114 of FIG. 1. In an aspect, machine learning system 204 may include one or more neural networks, such as, feature extractor 206A, shared encoder 206B, and depth decoder 206C (collectively, "neural networks 206") comprising respective sets of layers 208A, 208B, 208C (collectively, "layers 208"). Each of neural networks 206 may comprise various types of neural networks, such as, but not limited to, recursive neural networks (RNNs), convolutional neural networks (CNNs), and deep neural networks (DNNs).

Computing system 200 may also be implemented as any suitable external computing system accessible by controller 114, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202, neural networks 206, soiling decoder 252, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., neural networks 206, soiling decoder 252, etc.), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, neural networks 206 may receive input data 210 and may generate output data 212. Processed output data 212 of different neural networks 206 may be used as input data for soiling decoder 252. Input data 210 and output data 212 may contain various types of information. For example, input data 210 may include multimodal data. The term "multimodal data" or "multimodal information" is used herein to refer to information that may be composed of a plurality of media or data types such as, but not limited to, image data, video data, audio data, source text data, numerical data, speech data, and so on. Output data 212 may include various features, depth estimates, and so on.

Each set of layers 208 may include a respective set of artificial neurons. Layers 208A for example, may include an input layer, a feature layer, an output layer, and one or more hidden layers. Layers 208 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Each input of each artificial neuron in each layer of the sets of layers 208 is associated with a corresponding weight in weights 216. The output of the k-th artificial neuron in neural network 206 may be defined as:

$$y_k = \phi(W_k . X_k) \tag{1}$$

In Equation (1), $y_k$ is the output of the k-th artificial neuron, $\phi(\cdot)$ is an activation function, $W_k$ is a vector of weights for the k-th artificial neuron (e.g., weights in weights 216), and $X_k$ is a vector of value of inputs to the k-th artificial neuron. In some examples, one or more of the inputs to the k-th artificial neuron is a bias term that is not an output value of another artificial neuron or based on source data. Various activation functions are known in the art, such as Rectified Linear Unit (ReLU), Tan H, Sigmoid, and so on.

Machine learning system 204 may comprise a pre-trained model that is trained using training data 213 and one or more pre-trained neural networks 206, in accordance with techniques described herein. In an aspect, a LIDAR sensor range images feature extractor 206A may be configured to implement a computer vision algorithm that extracts features from LIDAR sensor range images. The extracted features may then be used for a variety of tasks, such as object detection, 3D reconstruction, and scene understanding. There are a variety of different feature extractors that may be used for LIDAR sensor range images. Some of the most common include but are not limited to: an intensity features extractor, special features extractor, and geometric features extractor. A multi-camera input images shared encoder 206B may have a neural network architecture that may be used to extract features from multiple camera images. The shared encoder 206B may be shared across all of the cameras. Accordingly, the shared encoder 206B may extract the features in a consistent way. The shared encoder 206B may be helpful for tasks such as object detection and scene understanding, as it may help to ensure that the features are extracted correctly. The combined features may then be used by machine learning system 204 for a downstream task, such as, but not limited to depth estimation. A depth decoder 206C may have a neural network architecture that may be used to estimate the depth of objects in a scene from a single image. The depth decoder 206C may take the output of the shared encoder 206B as input and may output a depth map, which is a 2D image that represents the distance to each pixel in the scene.

In an aspect, machine learning system 204 may also include soiling decoder 252. The soiling decoder 252 may have a neural network architecture that may be used to detect and segment soiling on camera images. The soiling decoder 252 may be configured to output a mask, which may be a 2D image that indicates the areas of the image that are soiled. The soiling decoder 252 may be implemented using a variety of different neural network architectures, such as, but not limited to, convolutional neural networks (CNNs) and recurrent neural networks (RNNs). The choice of architecture may depend on the specific task at hand. In addition to detecting and segmenting soiling on camera images, the soiling decoder 252 may be used to improve the performance of other tasks, such as, but not limited to, object detection and scene understanding.

As noted above, autonomous vehicle's sensors should be able to accurately detect and avoid obstacles, even in challenging conditions such as rain, fog, or snow. If the cameras are soiled, they may not be able to see obstacles clearly, which may lead to an accident. Soiling may be detected and segmented out in a scene using a variety of techniques, including, but not limited to, deep learning, calculation of attention-guided depth consistency measure and feature gating. An attention-guided depth consistency measure is a method for measuring the consistency of depth estimates between two images. The method uses an attention mechanism to focus on the most salient features in the images, and then compares the depth estimates for these features. Deep learning technique described herein involves using a deep neural network to learn the features of soiled regions. Feature gating is a technique used in machine learning to select which features are most important for a particular task. The goal of feature gating is to improve the performance of a machine learning model by reducing the number of features that it needs to consider.

Figure 3:
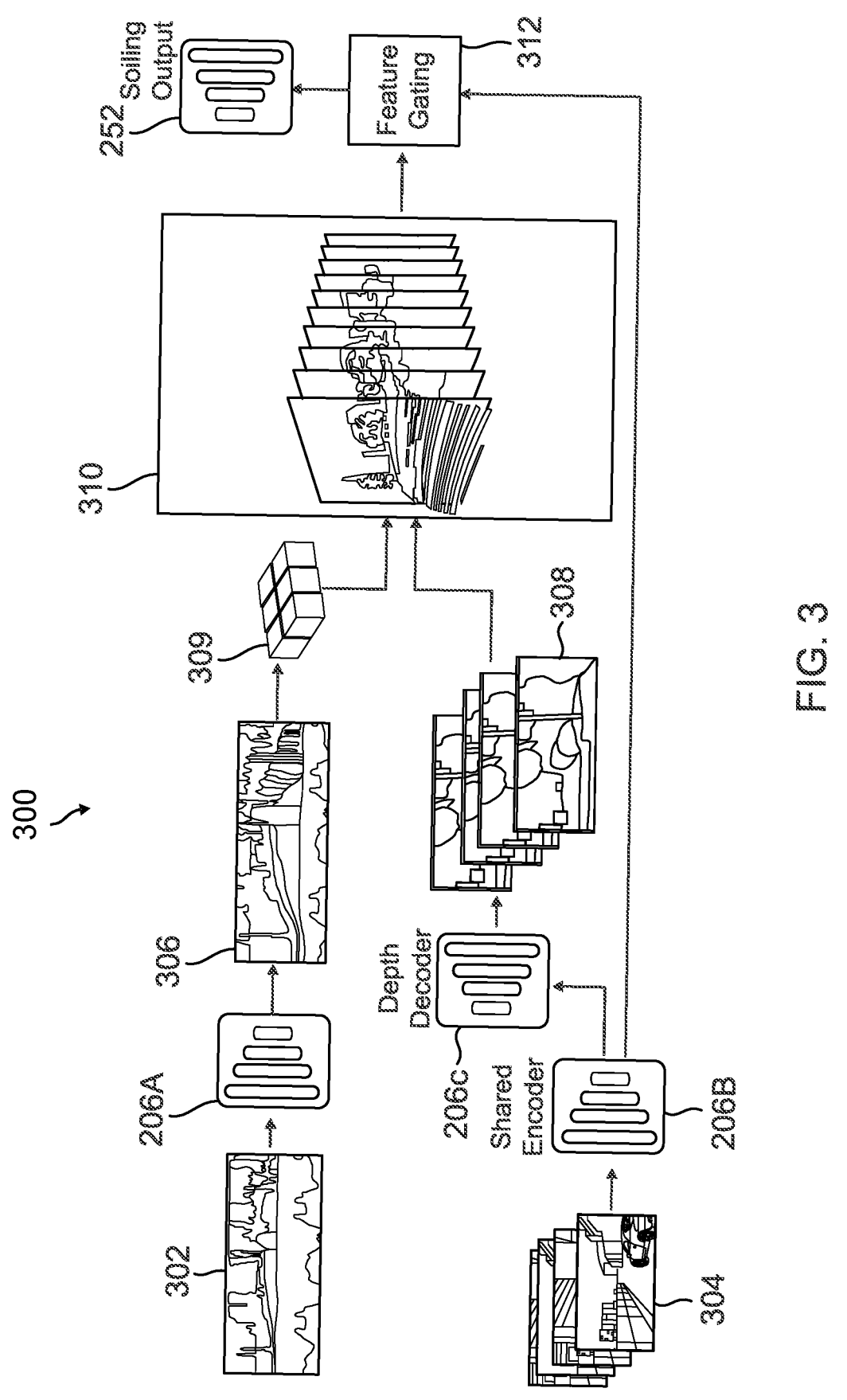
FIG. 3 is a block diagram illustrating an example soiling detection framework that may perform the techniques of this disclosure.

FIG. 3 is a block diagram illustrating an example soiling detection framework that may perform the techniques of this disclosure. FIG. 3 is provided for purposes of explanation and should not be considered limiting of the techniques as broadly exemplified and described in this disclosure. For purposes of explanation, this disclosure describes framework 300 illustrated in FIG. 3 is a block diagram illustrating an example soiling detection framework that may perform the techniques of this disclosure. In the example of FIG. 3, neural networks 206 may receive input data 210. In an aspect, feature extractor 206A may receive one or more LIDAR sensor range images 302 acquired by one or more LIDAR sensors 128 and shared encoder 206B may receive one or more multi-camera input images 304 acquired by a plurality of cameras 130-134. At least some of the aforementioned images may include one or more soiled regions. In an aspect, LIDAR sensor range images 302 may be created using LIDAR sensor 128 that rotates around a vertical axis. As the LIDAR sensor 128 rotates, it emits laser pulses and measures the time it takes for the pulses to return. The distance to the nearest object may be then calculated by the LIDAR sensor 128 for each pixel in the image. As noted above, in autonomous driving, LIDAR sensor range images 302 may be used to create a 3D map of the surrounding environment, which may be used to help the autonomous vehicle 102 navigate safely. LIDAR sensor range image 302 may be a complete 2D representation of the 3D scene. In other words, the LIDAR sensor range image 302 may contain information about the distance between the LIDAR sensor 128 and every object in the scene. In autonomous vehicle 102, multi-camera input images 304 may be used to provide a more complete and accurate view of the environment around the autonomous vehicle 102. Such accurate view of the environment may be helpful for a variety of tasks, such as, but not limited to, object detection, scene understanding, and obstacle avoidance. There are several benefits to using multi-camera input images 304 in autonomous vehicle 102. First, multi-camera input images 304 may help to improve the accuracy of object detection because multiple cameras 130-134 may provide different perspectives on the same object, which may help to reduce occlusions and improve the accuracy of the object's bounding box. Second, multi-camera input images 304 may help to improve the accuracy of scene understanding because multiple cameras 130-134 may provide different views of the same scene. Different views of the same scene may help to identify objects that may be difficult to see from a single perspective.

In an aspect, LIDAR sensor range images feature extractor 206A may be configured to implement a computer vision algorithm that extracts features from LIDAR sensor range images 302. The extracted features may then be used for a variety of tasks, such as object detection, 3D reconstruction, and scene understanding. There are a variety of different feature extractors that may be used for LIDAR sensor range images 302. Some of the most common include but are not limited to: an intensity features extractor, special features extractor, and geometric features extractor. Intensity features may be based on the intensity of the LIDAR sensor returns. For example, the mean intensity of a region may be used to indicate the presence of an object in the region. Spatial features may be based on the spatial distribution of the LIDAR sensor returns. For example, the number of LIDAR sensor returns in a region may be used to indicate the size of an object. Geometric features may be based on the geometric properties of the LIDAR sensor returns. For example, the shape of a region may be used to indicate the type of object. Once the feature extractor 206A extracts features from the LIDAR sensor range images 302, the machine learning system 204 may further process the one or more LIDAR sensor range images 302 to fill in any sparse regions by using a morphological filter 306 (e.g., dilation filter) to make the extracted features dense.

The morphological filter 306 is a type of image processing filter that expands regions of high intensity in an image. Morphological filter 306 may be used to fill in sparse regions in an image, such as those that may be caused by noise or occlusions. The dilation is a mathematical operation that takes an image as input and outputs a new image. The new image may be created by expanding the regions of high intensity in the input image. The expansion may be done by using a structuring element, which is a small shape that may be used to probe the input image. The structuring element is typically a square or a circle, but generally, the structuring element may be any shape. The size of the structuring element determines how much the regions of high intensity are expanded.

For illustrative purposes only assume that $R_i$ be the LIDAR sensor range image 302 acquired by the LIDAR sensor 128 and assume that $R'_i$ is the densified range image obtained by machine learning system 204 applying a morphological filter 306 to $R_i$. The morphological filter 306 may be represented as a binary mask, where each pixel in the mask has a value of 1 if it is within a certain radius r of a valid pixel in $R_i$ and 0 otherwise. The morphological filter 306 may be a dilation filter that expands regions of high intensity in an image. The morphological filter 306 may be used to fill in sparse regions in an image, such as those that may be caused by noise or occlusions. In an aspect, the machine learning system 204 may use the binary mask to determine which pixels in the range image $R_i$ are eligible to be expanded. If a pixel in the range image $R_i$ has a value of 1 in the binary mask, then it will be expanded. If a pixel in the range image $R_i$ has a value of 0 in the binary mask, then it will not be expanded. The radius r of the binary mask determines how far the morphological filter 306 will expand the regions of high intensity in the range image $R_i$. A larger radius will result in a more densified range image, while a smaller radius will result in a less densified range image. The densified range image $R'_i$ may be calculated using the following formula (2):

$$R'_i = Ri \oplus B \qquad (2)$$

where:
$R_i$ is the LIDAR sensor range image 302 acquired by the LIDAR sensor 128,
B is the binary mask,
$\oplus$ is the dilation operator.

The dilation operator is a mathematical operation that expands regions of high intensity in an image. In an aspect, the dilation operator may be implemented using a convolution operation. The resulting densified range image $R'_i$ may be further expressed using formula (3):

$$R'ij = \max \{Rik | k \in B(i, r)\} \qquad (3)$$

where:
$R_{ij}$ is the intensity of pixel (i, j) in the densified range image $R'_i$,
$R_{ik}$ is the intensity of pixel (i, k) in the range image $R_i$,
B (i, r) is the set of pixels in the binary mask centered at i and with a radius of r, max is the maximum operation.

In an aspect, the max operation may select the maximum range value within the neighborhood defined by the binary mask. In other words, the max operation effectively fills in the gaps between valid pixels in $R_i$, resulting in a denser range image $R'_i$. For example, if the binary mask has a radius of 2 pixels, the neighborhood defined by the binary mask may include the pixel at (i, j), as well as the pixels at (i−1, j), (i+1, j), (i, j−1), and (i, j+1). The max operation may then select the maximum range value from these 5 pixels. If the maximum range value is 10, then the intensity of pixel (i, j) in the densified range image $R'_i$ will be 10. If the maximum range value is 5, then the intensity of pixel (i, j) in the densified range image $R'_i$ will be 5. The max operation may effectively fill in the gaps between valid pixels in $R_i$ by assigning the maximum range value to all of the pixels in the neighborhood defined by the binary mask. In other words, the max operation results in a denser range image $R'_i$ that is more accurate than the original range image $R_i$.

In an aspect, the shared encoder 206B may have a neural network architecture that may be used to extract features from multiple camera input images 304. The shared encoder 206B may be shared across all of the cameras 130-134. Accordingly, the shared encoder 206B may extract the features in a consistent way. As shown in FIG. 3, the input to the shared encoder 206B may be a set of multiple camera input images 304. The shared encoder 206B may be configured to extract and combine features from each of the camera input images 304. In an aspect, the machine learning system 204 may use the combined features as an input to the depth decoder 206C. The shared encoder 206B may be implemented using a variety of different neural network architectures. For example, the shared encoder 206B may be implemented as a CNN or RNN.

The depth decoder 206C may have a neural network architecture that may be used to estimate the depth of objects in a scene. The depth decoder 206C may take the output of the shared encoder 206B (combined features) as input and may output one or more depth estimates 308. In an aspect, the depth decoder 206C may generate the depth estimates 308 by learning the relationship between the camera input images 304 and the depth of the objects in the scene. For example, the depth decoder 206C may be trained on a dataset of paired images and depth maps. The images in the dataset may be used to train the depth decoder 206C to identify the objects in the scene, and the depth maps may be used to train the depth decoder 206C to estimate the depth of the objects. Once the depth decoder 206C is trained, the machine learning system 204 may use the pre-trained depth decoder 206C to generate depth estimates for new images based on the combined features provided by the shared encoder 206B. For example, the depth decoder 206C may first identify the objects in the new image based on the combined features, and then the depth decoder 206C may estimate the depth of the objects based on the relationship that it learned from the training dataset.

In an aspect, once the machine learning system 204 obtains LIDAR sensor range depth features 309 from the morphological filter 306 and obtains the depth estimates 308 from the depth decoder 206C, the machine learning system 204 may use a distance-based segmentation technique to generate the attention map for the soiling detection problem. A distance-based segmentation technique is a type of image segmentation technique that uses the distance between pixels to segment an image. Typically, the distance between pixels may be calculated using a variety of different methods, such as, but not limited to, the Euclidean distance, the Manhattan distance, and the Chebyshev distance. In the context of soiling detection, the machine learning system 204 may use a distance-based segmentation technique to generate an attention map by calculating the distance between each pixel in the image and the nearest soiled pixel. The pixels that are closest to the soiled pixels will have a high value in the attention map, while the pixels that are farthest from the soiled pixels will have a low value in the attention map. The attention map may then be used to focus the machine learning system's 204 attention on the pixels that are most likely to be soiled. The distance-based segmentation technique described below may help the machine learning system 204 to improve its accuracy in detecting soiling.

In an aspect, the machine learning system 204 may implement distance-based segmentation by dividing the camera image into multiple layers based on the distance from the camera. More specifically, the machine learning system 204 may calculate the distance between each pixel in the camera image and the camera. The pixels that are closest to the camera may be in the lowest layer, while the pixels that are farthest from the camera may be in the highest layer. Instead of directly projecting points from the LIDAR sensor into the image plane of the camera, the machine learning system 204 may project each LIDAR sensor point onto the layer that is closest to it. Such projection ensures that points that are close together in 3D space are mapped to neighboring pixels in the camera image.

In an aspect, the machine learning system 204 may perform the projection using the following formula (4):

$$x = K[R|t]pi \tag{4}$$

where:

P={$p_i$} is the LIDAR sensor range image, where $p_i$ is the range value for pixel i, K is the camera intrinsic matrix, which describes the focal length and principal point of the camera, R is the rotation matrix, which describes the rotation of the camera with respect to the LIDAR sensor, t is the translation matrix, which describes the translation of the camera with respect to the LIDAR sensor, x is the projected point in the image plane.

The projection formula (4) says that the projected point x is equal to the product of the camera intrinsic matrix K, the concatenation of the rotation matrix R and the translation matrix t, and the LIDAR sensor range point $p_i$. In other words, the projection formula (4) takes the LIDAR sensor range point $p_i$ and projects it onto the camera plane using the camera's intrinsic and extrinsic parameters. The result is the projected point x, which is a 2D point in the image plane.

In an aspect, next, for each projected point x, the machine learning system 204 may calculate the distance between x and the camera center. In addition, the machine learning system 204 may find the layer i such that d_layer_i−1<distance<d_layer_i and may assign the projected point x to layer i. The projected points in layer i may be denoted as $X_i$. The purpose of this process is to group the projected points by their distance from the camera.

In an aspect, to compute the distance between a pixel and the camera center, the machine learning system 204 may use the following formula (5)

$$Z_{ij} = K^{-1}[u_i, v_i, 1]^T * d_{ij} \tag{5}$$

where:

K is the camera intrinsic matrix, which describes the focal length and principal point of the camera, $u_i$ and $v_i$ are the pixel coordinates, which are the (x, y) coordinates of the pixel in the image plane, $d_{ij}$ is the depth value, which is the distance of the pixel from the camera, $Z_{ij}$ is the distance between the pixel and the camera center in camera coordinate system.

The distance formula (5) says that the distance between the pixel and the camera center is equal to the inverse of the camera intrinsic matrix K, multiplied by the vector [$u_i$, $v_i$, 1], and then multiplied by the depth value $d_{ij}$. In other words, the formula (5) takes the pixel coordinates and the depth value and uses the camera intrinsic matrix to compute the distance between the pixel and the camera center in camera coordinate system.

In an aspect, to assign each pixel to a layer, the machine learning system 204 may use the following formula (6):

$$\text{layer}(i, j) = \min\{i | Z_{ij} < \text{d\_layer\_i}\}, \tag{6}$$

where:

layer (i, j) is the layer that pixel (i, j) is assigned to, $Z_{ij}$ is the distance between pixel (i, j) and the camera center in camera coordinate system, d_layer_i is the distance of layer i from the camera, min is the minimum function.

The assignment formula (6) says that the layer that pixel (i, j) is assigned to is the minimum i such that $Z_{ij}$<d_layer_i. In other words, the formula (6) takes the distance between the pixel and the camera center and uses the layer distances to find the layer that the pixel is closest to. For example, if the camera view has 3 layers, with distances of 100 m, 200 m, and 300 m, then a pixel with a distance of 150 m would be assigned to layer 2. The purpose of this process is to improve grouping the pixels by their distance from the camera.

In an aspect, the machine learning system 204 may use the layers to create an attention map A using the following formula (7):

$$A_{ij} = 1 \text{ if layer}(i, j) < \text{layer}(i+k, j+1) \text{ for some } k, \tag{7}$$

$$1 \in B(0, r) \text{ and } A_{ij} = 0 \text{ otherwise,}$$

where:

$A_{ij}$ is the attention weight for pixel (i, j), layer (i, j) is the layer that pixel (i, j) is assigned to, k and 1 are the pixel offsets, B (0, r) is the 2D ball of radius r around the origin.

The attention map formula (7) says that the attention weight for pixel (i, j) is 1 if the pixel is closer to the camera than its neighbors within a radius of r. Otherwise, the attention weight is 0. In other words, the formula (7) takes the layer assignments for each pixel and uses them to create an attention map that highlights the pixels that are closest to the camera.

In an aspect, the attention map A may capture regions where the depth estimates differ significantly. As noted above, the machine learning system 204 may create the attention map by comparing the layer assignments for each pixel to the layer assignments for its neighbors. If the layer assignments for a pixel and its neighbors are different, then the pixel is likely to be affected by soiling. In an aspect, the machine learning system 204 may calculate the SSIM score. The SSIM score may be a measure of the similarity between two images. The SSIM score may be used to measure the consistency of depth estimates. In an aspect, the machine learning system 204 may create the attention-guided depth consistency measure 310 by combining the attention map A with the SSIM score. The attention map may be used by the machine learning system 204 to weight the SSIM score, so that regions with high attention weights have a greater impact on the overall measure. The purpose of the attention-guided depth consistency measure 310 may be to identify regions where the depth estimates are inconsistent. These regions are more likely to be affected by soiling, so they can be used to focus the attention of depth refinement algorithms.

In an aspect, the attention map and the SSIM score are two different measures of depth consistency. The attention map is a measure of how much attention the machine learning system 204 is paying to different parts of the image, while the SSIM score is a measure of how similar two images are. To create the attention-guided depth consistency measure 310, the machine learning system 204 may combine these two measures in a weighted sum. The weight for the attention map is typically higher than the weight for the SSIM score, because the attention map provides more information about which parts of the image are important for depth consistency. The resulting attention-guided depth consistency measure 310 may be a more robust measure of depth consistency than either the attention map or the SSIM score alone because it takes into account both the overall similarity of the images and the focus of the model's attention. In an aspect, the machine learning system 204 may calculate the attention-guided depth consistency measure 310 by first calculating weighted SSIM score using formula (8)

$$\text{weighted\_SSIM\_score} = \text{attention\_map} * \text{SSIM\_score,} \qquad (8)$$

where
attention_map is the attention map,
SSIM_score is the SSIM score,
weighted_SSIM_score is the weighted SSIM score.

The attention map is a measure of how much attention the machine learning system 204 is paying to different parts of the image. Accordingly, the attention map may be high in areas where the machine learning system 204 is confident in its depth estimates, or in regions where soiling is more likely to occur, and low in areas where the network is less confident. The SSIM score is a measure of how similar two images are. Accordingly, the SSIM score may be high when two images are very similar, and low when two images are very different. By elementwise multiplying the attention map with the SSIM score, the machine learning system 204 may give more importance to the regions where the depth estimates differ significantly because the attention map may be high in these regions, and the SSIM score may be low. In other words, the regions where the depth estimates differ significantly are more important for depth consistency, and, as a result, they get more weight in attention-guided depth consistency measure 310. In an aspect, the machine learning system 204 may use the weighted SSIM score as a measure of depth consistency.

In an aspect, the machine learning system 204 may also calculate the attention-guided depth consistency score. The attention-guided depth consistency score may be a measure of how consistent the depth estimates from the camera and LIDAR sensor are, taking into account the attention map. In an aspect, the machine learning system 204 may first take the weighted average of the SSIM score and the attention map. The weighted average may be calculated by multiplying the SSIM score by the attention map, and then divided by the sum of the attention map. The attention-guided depth consistency score is a single score that represents the overall depth consistency. The attention-guided depth consistency score may be a more robust measure of depth consistency than the SSIM score alone because the attention-guided depth consistency score may take into account both the overall similarity of the images and the focus of the machine learning system's 204 attention.

In an aspect, the machine learning system 204 may use the feature gating mechanism 312 to modulate the extracted camera features based on the attention-guided depth consistency score. For example, the machine learning system 204 may multiply the camera features by a weight that is based on the attention-guided depth consistency score. The weight may be calculated by the feature gating mechanism 312, which may map the attention-guided depth consistency score to a value between 0 and 1. A value of 0 means that the camera features will be ignored, while a value of 1 means that the camera features will be passed on to the soiling decoder 252 unchanged. In an aspect, the feature gating mechanism 312 may be implemented as a sigmoid function or a softplus function. The sigmoid function outputs a value between 0 and 1, while the softplus function outputs a value between 0 and infinity. The gated feature may then be used by the machine learning system 204 as an input to the soiling decoder 252, which may be configured to predict the presence and type of soiling. The feature gating mechanism 312 may enable the machine learning system 204 to focus on the regions where the depth estimates are more consistent. This is important because soiling is more likely to occur in regions where the depth estimates are inconsistent. The feature gating mechanism 312 may also allow the machine learning system 204 to learn to ignore the regions where the depth estimates are unreliable because the machine learning system 204 may sometimes make mistakes in its depth estimates, and the feature gating mechanism 312 may help to prevent these mistakes from affecting the soiling prediction.

The advantage of using the feature gating mechanism 312 before passing features on to the soiling decoder 252 is that because the feature gating mechanism 312 uses the attention-guided depth consistency score to weight the camera features, it allows the machine learning system 204 to selectively focus on important features for the soiling task, while suppressing irrelevant or noisy features. The attention-guided depth consistency score indicates the regions where the depth estimates are more consistent, and these regions are more likely to be important for the soiling task. By weighting the camera features with the attention-guided depth consistency score, the machine learning system 204 is able to focus on these regions and ignore the regions where the depth estimates are less consistent to improve the accuracy of the soiling prediction. In addition, the feature gating mechanism 312 may allow the machine learning system 204 to learn to ignore the regions where the depth estimates are unreliable.

In an aspect, the feature gating mechanism 312 may lead to more accurate and robust soiling detection performance at least in two ways. First, by selectively focusing on important features, the machine learning system 204 is able to better distinguish between different types of soiling and non-soiling instances in the image, because the machine learning system 204 may be able to focus on the features that are most relevant to the soiling task and ignore the features that are not relevant. Second, by discarding redundant or unimportant features during inference, the machine learning system

204 may reduce the computational cost and memory usage, since the machine learning system 204 does not have to process all of the features in the image, only the features that are most relevant to the soiling task. In addition to the benefits mentioned above, the feature gating mechanism 312 may also help to improve the interpretability of the machine learning system 204. For example, the gating function may be used to visualize which features are most important for the soiling task. Such visualization may help to understand how the machine learning system 204 is making its predictions and may help to identify potential areas for improvement. In an aspect, the soiling decoder 252 may be a neural network that may take the output of the feature gating mechanism 312 (the gated feature F') as input and may output a probability distribution over the different types of soiling. The softmax function may be used to normalize the probability distribution so that the sum of the probabilities is 1. The softmax function is a commonly used activation function in neural networks for classification tasks. The softmax function may take a vector of real numbers as input and may output a vector of probabilities, where each probability represents the likelihood that the input belongs to a particular class. In the case of the soiling decoder 252, the softmax function may output a probability distribution over the different types of soiling shown in FIG. 4. This distribution may be used to determine the most likely type of soiling in the image.

In an aspect, the distance-based segmentation technique disclosed herein may be a way to create an attention map that highlights regions where the camera is likely to be soiled. The disclosed technique may work by first calculating the distance between the camera and the LIDAR sensor 128. Then, the distance map may be thresholded to create a binary map, where 1 indicates that the pixel is close to the LIDAR sensor 128 and 0 indicates that the pixel is far from the LIDAR sensor 128. In an aspect, the machine learning system 204 may use the binary map to create an attention map, where the pixels with a value of 1 are given a high attention weight and the pixels with a value of 0 are given a low attention weight. The machine learning system 204 may use the attention map to weight the SSIM score, giving more importance to the regions where the depth estimates differ significantly. By incorporating the attention map into the attention-guided depth consistency measure 310, the machine learning system 204 may improve the accuracy of the soiling detection because the attention map allows the machine learning system 204 to focus on the regions where the depth estimates are more consistent, which are the regions where soiling is more likely to occur. In addition, the attention map may also allow the machine learning system 204 to learn to ignore the regions where the depth estimates are unreliable. Ignoring the unreliable regions may be important because the machine learning system 204 may sometimes make mistakes in its depth estimates, and the attention map may help to prevent these mistakes from affecting the soiling prediction.

In summary, soiling of camera sensors may significantly degrade the performance of autonomous vehicles 102 in a number of ways. For example, soiling may: 1) reduce the amount of light that reaches the sensor, making it difficult to see objects in low-light conditions; 2) blur the image, making it difficult to identify objects; 3) introduce noise into the image, making it difficult to distinguish between objects and background; 4) change the color of the image, making it difficult to recognize objects. All of the aforementioned effects may make it difficult for the autonomous vehicle 102 to accurately perceive their surroundings, which may lead to accidents. By detecting and correcting the soiling in real-time, the disclosed techniques may help improve the safety of the autonomous vehicle 102 by: 1) reducing the amount of light that is blocked by the soiling, allowing the corresponding sensor to see more objects; 2) removing the blur from the image, making it easier to identify objects; 3) reducing the noise in the image, making it easier to distinguish between objects and background; 4) correcting the color of the image, making it easier to recognize objects. All of these effects may help the autonomous vehicle 102 to more accurately perceive their surroundings, which may help to prevent accidents. In addition to improving safety, the disclosed techniques may also help to improve the efficiency of the autonomous vehicle 102 by: 1) reducing the number of false positives, which may lead to unnecessary braking or steering; 2) reducing the number of false negatives, which may lead to accidents; 3) improving the overall performance of the machine learning system 204, making it more reliable and capable of operating in a wider range of conditions.

Figure 4:
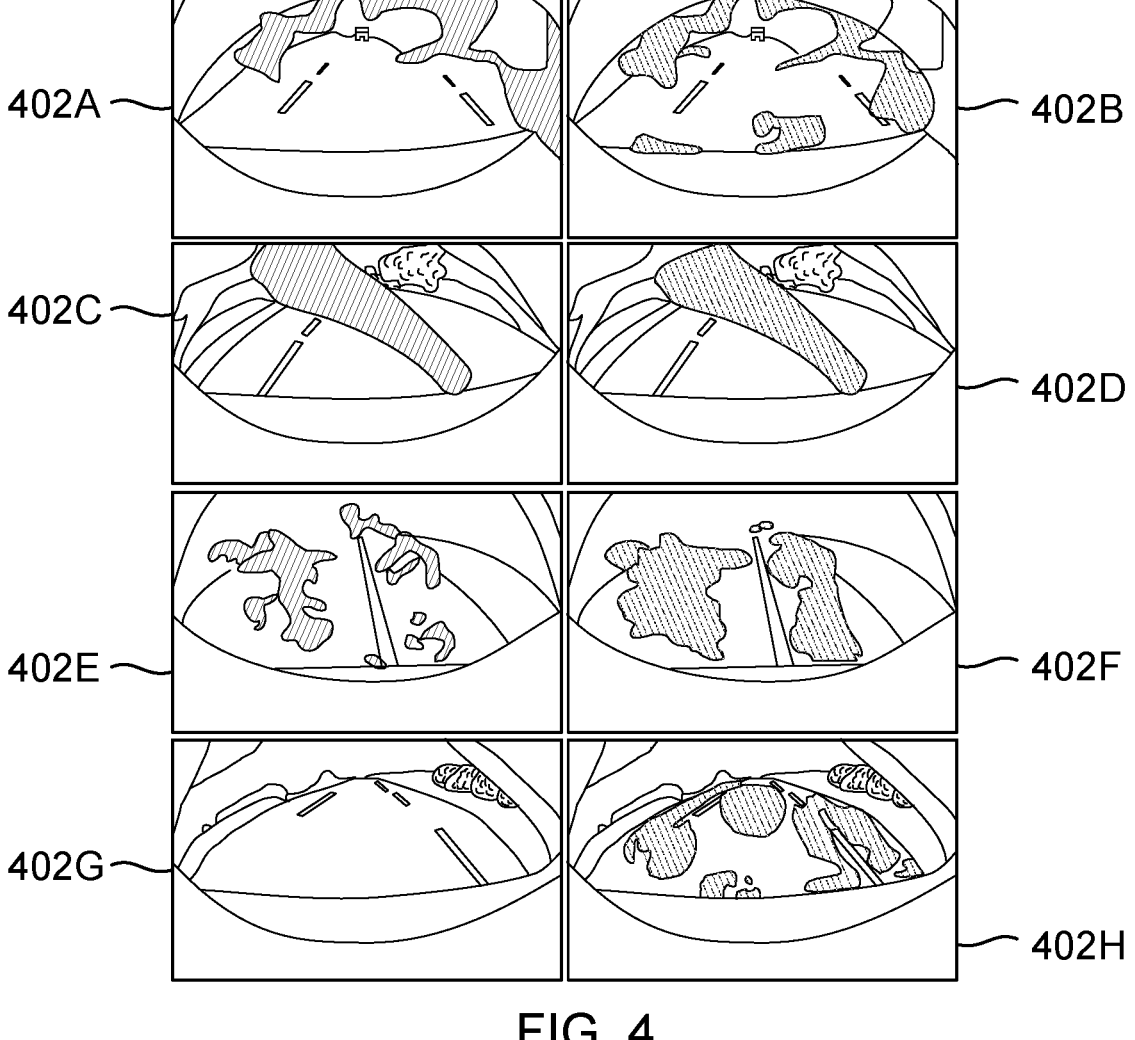
FIG. 4 is a diagram illustrating various non-limiting examples of soiling detection in images in accordance with the techniques of this disclosure.

FIG. 4 is a diagram illustrating various examples of soiling detection in images. More specifically, FIG. 4 illustrates detected mud soiling 402B, detected grass soiling 402D, detected sand soiling 402F and detected water soiling 402H (collectively, "soiling" 402) in respective input images 402A, 402C, 402E and 402G. As used herein, the term "mud soiling" refers to a type of soiling that may occur when mud is deposited on a camera sensor. As used herein, the term "grass soiling" refers to a type of soiling that occurs when grass is deposited on a camera sensor. The term "sand soiling" refers to a type of soiling that occurs when sand is deposited on a camera sensor. As used herein, the term "water soiling" refers to a type of soiling that occurs when water is deposited on a camera sensor. Mud/grass/sand/water may be deposited on a camera sensor in a variety of ways, such as, but not limited to: 1) mud/grass/sand/water being splashed onto a camera sensor by rain, snow, or other water sources; 2) mud/grass/sand/water may be blown onto a camera sensor by wind; 3) mud/grass/sand/water may be transferred to a camera sensor by contact with soiled/wet objects, such as tires, feet, or other vehicles.

Soiling 402 may cause false positives or false negatives in object detection and classification, which may lead to incorrect decisions by the autonomous vehicle 102. For example, soiling may cause one or more cameras 130-134 to mis-identify a pedestrian as a traffic cone, leading to the autonomous vehicle 102 braking unnecessarily. As yet another example, soiling may cause a radar sensor to misidentify a car as a pedestrian, which may lead to the autonomous vehicle 102 swerving to avoid the pedestrian and colliding with another object. Accordingly, some additional benefits of accurate detection and classification of soiled areas may include but are not limited to: improving the efficiency of the autonomous vehicle 102 by reducing the number of unnecessary braking or steering events; improving the comfort of passengers by reducing the number of sudden braking or steering events; reducing the environmental impact of autonomous vehicle 102 by reducing the amount of fuel wasted due to unnecessary braking or steering events.

Traditional methods of cleaning camera sensors 130-134 in the autonomous vehicle 102 may require manual intervention, which may be time-consuming and may lead to downtime. For example, a human operator may need to physically clean the sensor, or they may need to use a cleaning solution that may take time to dry. Such downtime may be a problem in situations where the autonomous vehicle 102 is needed to operate in a timely manner, or where the environment is not conducive to manual cleaning. By providing real-time detection and correction of soiling, the disclosed solution may improve the efficiency of the autonomous vehicle 102 by: eliminating the need for manual intervention, reducing the amount of time that the autonomous vehicle 102 is not operating, reducing the risk of accidents caused by soiled sensors.

In an aspect, the proposed solution may be based on a multimodal approach that combines information from LIDAR sensor 128 and camera sensors 130-134 because LIDAR sensor 128 and camera sensors 130-134 have different strengths and weaknesses, and by combining their information, the autonomous vehicle 102 may get a more complete and accurate picture of the environment. LIDAR sensors 128 are good at providing depth information, but they are not as good at detecting small objects or objects that are close to the ground. Camera sensors 130-134 are good at detecting small objects and objects that are close to the ground, but they are not as good at providing depth information. By combining the information from LIDAR sensors 128 and camera sensors 130-134, the autonomous vehicle 102 may get a better understanding of the environment, including the distance to objects, the size of objects, and the type of objects. Such environmental information may be used to detect soiling and to correct for the effects of soiling. The proposed solution is also based on a deep learning approach. In other words, the autonomous vehicle 102 is able to learn from data and improve its performance over time, which is important because the environment that autonomous vehicles 102 operate in is constantly changing, and the solution needs to be able to adapt to these changes. The proposed solution is based on a multimodal approach and a deep learning approach, which makes it a versatile solution that may be applied to a wide range of autonomous driving scenarios and environments. Following are some examples of how the proposed solution may be applied to different autonomous driving scenarios. In a city environment, the proposed techniques may be used to detect soiling 402 on camera sensors 130-134 that are mounted on the front of the autonomous vehicle 102. The detected soiling information may be used to operate the autonomous vehicle 102 (e.g., an ADAS system). For example, the classification of the soiled regions may be used to improve the performance of the autonomous vehicle's 102 object detection and classification algorithms. In a highway environment, the proposed techniques may be used to detect soiling 402 on LIDAR sensors 128 that are mounted on the front and rear of the autonomous vehicle 102. The detected soiling 402 on LIDAR sensors 128 information may be used to correct for the effects of soiling and to improve the performance of the autonomous vehicle's 102 obstacle avoidance algorithms. In a rural environment, the proposed techniques may be used to detect soiling 402 on camera sensors 130-134 that are mounted on the sides of the autonomous vehicle 102. Such soiling 402 information may be used to correct for the effects of soiling and to improve the performance of the autonomous vehicle's 102 lane keeping and lane departure warning algorithms.

Figure 5:
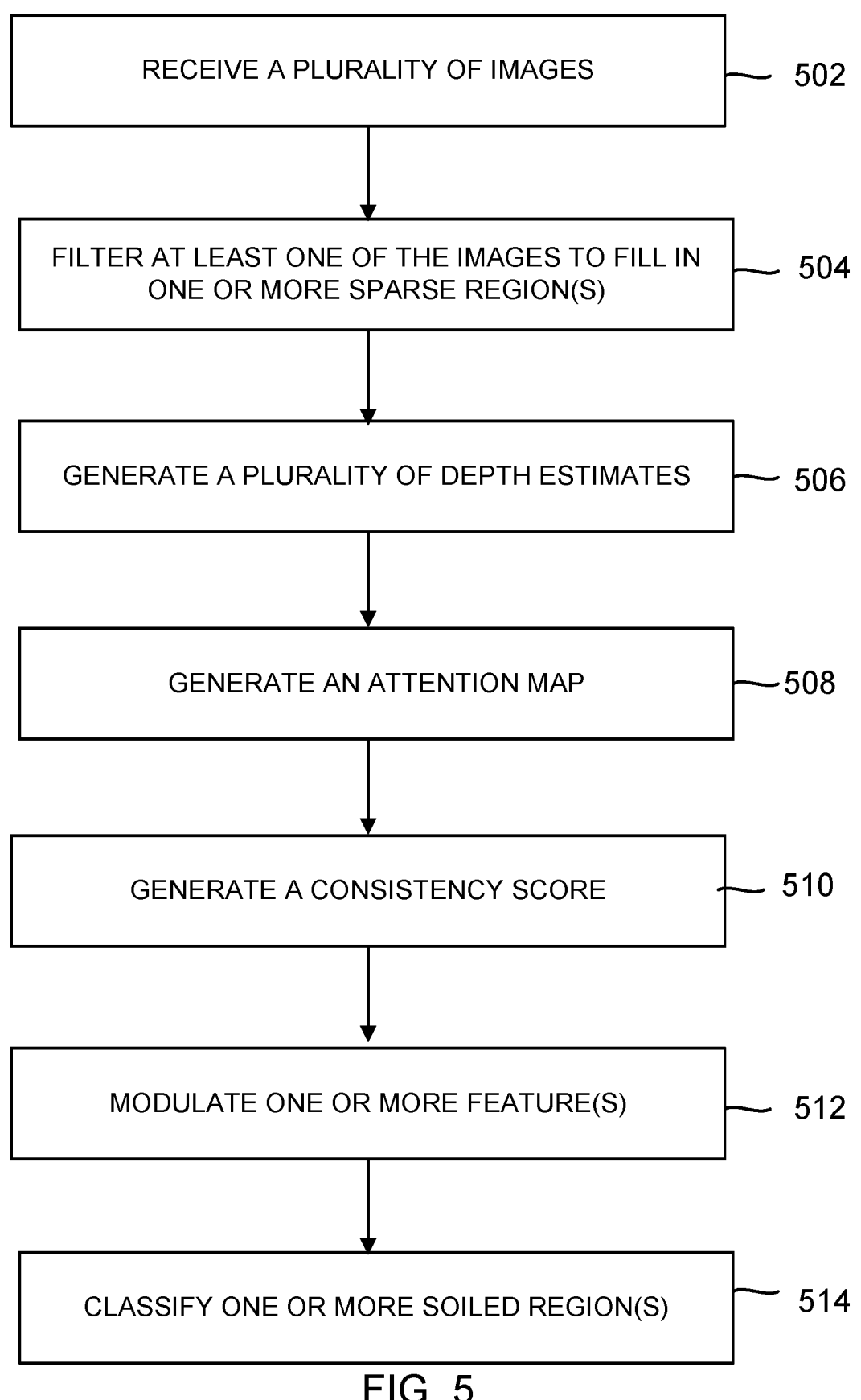
FIG. 5 is a flowchart illustrating an example method for classifying soiled regions in an image in accordance with the techniques of this disclosure.

FIG. 5 is a flowchart illustrating an example method for detecting soiled region in an image in accordance with the techniques of this disclosure. Although described with respect to computing system 200 (FIG. 2), it should be understood that other devices may be configured to perform a method similar to that of FIG. 5.

In this example, machine learning system 204 may initially receive one or more images (502). At least one of the images may include a LIDAR sensor range image 302 obtained from LIDAR sensor(s) 128. At least one other image may include a multi-camera input image 304 obtained from one or more cameras 130-134. The morphology filter 306 may filter the first image (LIDAR sensor range image 302) to fill in one or more sparse regions in the first image (504). For example, depth morphology filter 306 may expand the regions of high intensity in the first image. The morphology filter 306 may generate a densified range image. The depth decoder 206C may then generate a plurality of depth estimates 308 based on the second image (camera input image 304) (506). In an aspect, the depth decoder 206C may generate the depth estimates 308 by learning the relationship between the camera input images 304 and the depth of the objects in the scene. For example, the depth decoder 206C may be trained on a dataset of paired images and depth maps. Next, machine learning system 204 may generate an attention map by combining the filtered first image and the plurality of depth estimates 308 (508). Next, the machine learning system 204 may generate a consistency score indicative of a consistency of depth estimates between the first image and the second image based on the attention map (510). Machine learning system 204 may modulate one or more features extracted from the second image based on the consistency score using a gating mechanism (512). Soiled decoder 252 may generate a classification of one or more soiled regions in the second image based on the modulated one or more features (514).

The following numbered clauses illustrate one or more aspects of the devices and techniques described in this disclosure.

Clause 1. A method comprising: receiving a plurality of images, wherein a first image of the one or more images comprises a range image and a second image comprises a camera image; filtering, by one or more processors, the first image to generate a filtered first image, wherein the filtering includes a filter configured to fill in one or more sparse regions in the first image; generating, by the one or more processors, a plurality of depth estimates based on the second image; generating, by the one or more processors, an attention map by combining the filtered first image and the plurality of depth estimates; generating, by the one or more processors, a consistency score indicative of a consistency of depth estimates between the first image and the second image based on the attention map; modulating, by the one or more processors, one or more features extracted from the second image based on the consistency score using a gating mechanism to generate modulated one or more features; and generating, by the one or more processors, a classification of one or more soiled regions in the second image based on the modulated one or more features.

Clause 2—The method of clause 1, wherein the first image is generated in real time by a Light Detection and Ranging (LIDAR) sensor.

Clause 3—The method of clause 1, further comprising extracting one or more features from the first image prior to the filtering the first image.

Clause 4—The method of clause 1, wherein the filter comprises a morphological filter having a binary mask of pixels that expands one or more regions of the first image, wherein the binary mask is associated with a radius, and wherein the radius of the binary mask determines how far the morphological filter expands the one or more regions of the first image.

Clause 5—The method of any of clauses 2-3, further comprising generating the plurality of depth estimates using a depth decoder.

Clause 6—The method of any of clauses 2-3, wherein generating the attention map further comprises dividing the second image into a plurality of layers based on a distance from a camera used to acquire the second image.

Clause 7—The method of clause 6, wherein dividing the second image into the plurality of layers further comprises grouping one or more projected points based on the distance from the camera used to acquire the second image.

Clause 8—The method of clause 7, further comprising calculating the distance from the camera based on a plurality of pixel coordinates in a plane of the second image and a center of the camera in a camera coordinate system.

Clause 9—The method of any of clauses 7-8, wherein generating the consistency score comprises combining the attention map with a generated Structural Similarity Index Matrix (SSIM) score.

Clause 10—The method of clause 9, wherein the SSIM score indicates consistency of the plurality of depth estimates.

Clause 11—The method of clause 9, further comprising identifying the one or more soiled regions based on the consistency score.

Clause 12—The method of clause 1, wherein generating the classification further comprises generating the classification of the one or more soiled regions using a softmax function configured to normalize probability distribution.

Clause 13—The method of clause 1, further comprising operating an Advanced Driver Assistance Systems (ADAS) system based on the classification of the one or more soiled regions.

Clause 14—An apparatus for camera soiling detection, the apparatus comprising a memory for storing a plurality of images; and processing circuitry in communication with the memory, wherein the processing circuitry is configured to: receive the plurality of images, wherein a first image of the one or more images comprises a range image and a second image comprises a camera image; filter the first image to generate a filtered first image, wherein the filtering includes a filter configured to fill in one or more sparse regions in the first image; generate a plurality of depth estimates based on the second image; generate an attention map by combining the filtered first image and the plurality of depth estimates; generate a consistency score indicative of a consistency of depth estimates between the first image and the second image based on the attention map; modulate one or more features extracted from the second image based on the consistency score using a gating mechanism to generate modulated one or more features; and generate a classification of one or more soiled regions in the second image based on the modulated one or more features.

Clause 15—The apparatus of clause 14, wherein the first image is generated in real time by a Light Detection and Ranging (LIDAR) sensor.

Clause 16—The apparatus of clause 14, wherein the processing circuitry is further configured to extract one or more features from the first image prior to the filtering the first image.

Clause 17—The apparatus of clause 14, wherein the filter comprises a morphological filter having a binary mask of pixels that expands one or more regions of the first image, wherein the binary mask is associated with a radius, and wherein the radius of the binary mask determines how far the morphological filter expands the one or more regions of the first image.

Clause 18—The apparatus of any of clauses 15-16, wherein the processing circuitry is further configured to generate the plurality of depth estimates using a depth decoder.

Clause 19—The apparatus of any of clauses 15-16, wherein the processing circuitry configured to generate the attention map is further configured to divide the second image into a plurality of layers based on a distance from a camera used to acquire the second image.

Clause 20—The apparatus of clause 19, wherein the processing circuitry configured to divide the second image into the plurality of layers is further configured to group one or more projected points based on the distance from the camera used to acquire the second image.

Clause 21—The apparatus of clause 20, wherein the processing circuitry is further configured to calculate the distance from the camera based on a plurality of pixel coordinates in a plane of the second image and a center of the camera in a camera coordinate system.

Clause 22—The apparatus of any of clauses 20-21, wherein the processing circuitry configured to generate the consistency score is further configured to combine the attention map with a generated Structural Similarity Index Matrix (SSIM) score.

Clause 23—The apparatus of clause 22, wherein the SSIM score indicates consistency of the plurality of depth estimates.

Clause 24—The apparatus of clause 22, wherein the processing circuitry is further configured to identify the one or more soiled regions based on the consistency score.

Clause 25—The apparatus of clause 14, wherein the processing circuitry configured to generate the classification is further configured to generate the classification of the one or more soiled regions using a softmax function configured to normalize probability distribution.

Clause 26—The apparatus of clause 14, wherein the processing circuitry is further configured to operate an Advanced Driver Assistance Systems (ADAS) system based on the classification of the one or more soiled regions.

Clause 27—A computer-readable medium storing instructions that, when applied by processing circuitry, causes the processing circuitry to: receive a plurality of images, wherein a first image of the one or more images comprises a range image and a second image comprises a camera image; filter the first image to generate a filtered first image, wherein the filtering includes a filter configured to fill in one or more sparse regions in the first image; generate a plurality of depth estimates based on the second image; generate an attention map by combining the filtered first image and the plurality of depth estimates; generate a consistency score indicative of a consistency of depth estimates between the first image and the second image based on the attention map; modulate one or more features extracted from the second image based on the consistency score using a gating mechanism to generate modulated one or more features; and generate a classification of one or more soiled regions in the second image based on the modulated one or more features.

Clause 28—A device for camera soiling detection, the device comprising one or more means for performing steps of: receiving a plurality of images, wherein a first image of the one or more images comprises a range image and a second image comprises a camera image; filtering the first image to generate a filtered first image, wherein the filtering includes a filter configured to fill in one or more sparse regions in the first image; generating a plurality of depth estimates based on the second image; generating an attention map by combining the filtered first image and the plurality of depth estimates; generating a consistency score indicative of a consistency of depth estimates between the first image and the second image based on the attention map; modulating one or more features extracted from the second image based on the consistency score using a gating mechanism to generate modulated one or more features; and generating a classification of one or more soiled regions in the second image based on the modulated one or more features.

Clause 29—The device of clause 28, wherein the one or more means comprise one or more processors implemented in circuitry.

Clause 30—The device of clause 29, further comprising a memory to store the plurality of images.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method comprising:
receiving a plurality of images, wherein a first image of the plurality of images comprises a range image and a second image comprises a camera image;
filtering, by one or more processors, the first image to generate a filtered first image, wherein the filtering includes a filter configured to fill in one or more sparse regions in the first image;
generating, by the one or more processors, a plurality of depth estimates based on the second image;
generating, by the one or more processors, an attention map by combining the filtered first image and the plurality of depth estimates;
combining, by the one or more processors, the attention map with a generated Structural Similarity Index Matrix (SSIM) score to generate a consistency score indicative of a consistency of depth estimates between the first image and the second image based on the attention map;
modulating, by the one or more processors, one or more features extracted from the second image based on the consistency score using a gating mechanism to generate modulated one or more features; and
generating, by the one or more processors, a classification of one or more soiled regions in the second image based on the modulated one or more features.

2. The method of claim 1, wherein the first image is generated in real time by a Light Detection and Ranging (LIDAR) sensor.

3. The method of claim 1, further comprising extracting one or more features from the first image prior to the filtering the first image.

4. The method of claim 1, wherein the filter comprises a morphological filter having a binary mask of pixels that expands one or more regions of the first image, wherein the binary mask is associated with a radius, and wherein the radius of the binary mask determines how far the morphological filter expands the one or more regions of the first image.

5. The method of claim 1, further comprising generating the plurality of depth estimates using a depth decoder.

6. The method of claim 1, wherein generating the attention map further comprises dividing the second image into a plurality of layers based on a distance from a camera used to acquire the second image.

7. The method of claim 6, wherein dividing the second image into the plurality of layers further comprises grouping one or more projected points based on the distance from the camera used to acquire the second image.

8. The method of claim 7, further comprising calculating the distance from the camera based on a plurality of pixel coordinates in a plane of the second image and a center of the camera in a camera coordinate system.

9. The method of claim 1, wherein the SSIM score indicates consistency of the plurality of depth estimates.

10. The method of claim 1, further comprising identifying the one or more soiled regions based on the consistency score.

11. The method of claim 1, wherein generating the classification further comprises generating the classification of the one or more soiled regions using a softmax function configured to normalize probability distribution.

12. The method of claim 1, further comprising operating an Advanced Driver Assistance Systems (ADAS) system based on the classification of the one or more soiled regions.

13. An apparatus for camera soiling detection, the apparatus comprising:
   a memory for storing a plurality of images; and
   processing circuitry in communication with the memory, wherein the processing circuitry is configured to:
      receive the plurality of images, wherein a first image of the plurality of images comprises a range image and a second image comprises a camera image;
      filter the first image to generate a filtered first image, wherein the filtering includes a filter configured to fill in one or more sparse regions in the first image;
      generate a plurality of depth estimates based on the second image;
      generate an attention map by combining the filtered first image and the plurality of depth estimates;
      combine the attention map with a generated Structural Similarity Index Matrix (SSIM) score to generate a consistency score indicative of a consistency of depth estimates between the first image and the second image based on the attention map;
      modulate one or more features extracted from the second image based on the consistency score using a gating mechanism to generate modulated one or more features; and
      generate a classification of one or more soiled regions in the second image based on the modulated one or more features.

14. The apparatus of claim 13, wherein the first image is generated in real time by a Light Detection and Ranging (LIDAR) sensor.

15. The apparatus of claim 13, wherein the processing circuitry is further configured to extract one or more features from the first image prior to the filtering the first image.

16. The apparatus of claim 13, wherein the filter comprises a morphological filter having a binary mask of pixels that expands one or more regions of the first image, wherein the binary mask is associated with a radius, and wherein the radius of the binary mask determines how far the morphological filter expands the one or more regions of the first image.

17. The apparatus of claim 13, wherein the processing circuitry is further configured to generate the plurality of depth estimates using a depth decoder.

18. The apparatus of claim 13, wherein the processing circuitry configured to generate the attention map is further configured to divide the second image into a plurality of layers based on a distance from a camera used to acquire the second image.

19. The apparatus of claim 18, wherein the processing circuitry configured to divide the second image into the plurality of layers is further configured to group one or more projected points based on the distance from the camera used to acquire the second image.

20. The apparatus of claim 19, wherein the processing circuitry is further configured to calculate the distance from the camera based on a plurality of pixel coordinates in a plane of the second image and a center of the camera in a camera coordinate system.

21. The apparatus of claim 13, wherein the SSIM score indicates consistency of the plurality of depth estimates.

22. The apparatus of claim 13, wherein the processing circuitry is further configured to identify the one or more soiled regions based on the consistency score.

23. The apparatus of claim 13, wherein the processing circuitry configured to generate the classification is further configured to generate the classification of the one or more soiled regions using a softmax function configured to normalize probability distribution.

24. The apparatus of claim 13, wherein the processing circuitry is further configured to operate an Advanced Driver Assistance Systems (ADAS) system based on the classification of the one or more soiled regions.

25. A computer-readable medium storing instructions that, when applied by processing circuitry, causes the processing circuitry to:
   receive a plurality of images, wherein a first image of the plurality of images comprises a range image and a second image comprises a camera image;
   filter the first image to generate a filtered first image, wherein the filtering includes a filter configured to fill in one or more sparse regions in the first image;
   generate a plurality of depth estimates based on the second image;
   generate an attention map by combining the filtered first image and the plurality of depth estimates;
   combine the attention map with a generated Structural Similarity Index Matrix (SSIM) score to generate a consistency score indicative of a consistency of depth estimates between the first image and the second image based on the attention map;
   modulate one or more features extracted from the second image based on the consistency score using a gating mechanism to generate modulated one or more features; and
   generate a classification of one or more soiled regions in the second image based on the modulated one or more features.

26. A device for camera soiling detection, the device comprising one or more means for performing steps of:
   receiving a plurality of images, wherein a first image of the plurality of images comprises a range image and a second image comprises a camera image;
   filtering the first image to generate a filtered first image, wherein the filtering includes a filter configured to fill in one or more sparse regions in the first image;
   generating a plurality of depth estimates based on the second image;

generating an attention map by combining the filtered first image and the plurality of depth estimates;

combining the attention map with a generated Structural Similarity Index Matrix (SSIM) score to generate a consistency score indicative of a consistency of depth estimates between the first image and the second image based on the attention map;

modulating one or more features extracted from the second image based on the consistency score using a gating mechanism to generate modulated one or more features; and generating a classification of one or more soiled regions in the second image based on the modulated one or more features.

27. The device of claim 26, wherein the one or more means comprise one or more processors implemented in circuitry.

28. The device of claim 27, further comprising a memory to store the plurality of images.

* * * * *